(12) United States Patent
Sliwa et al.

(10) Patent No.: US 10,479,287 B2
(45) Date of Patent: Nov. 19, 2019

(54) DUAL PLANE HEATER FOR VEHICLE SENSOR SYSTEM

(71) Applicant: ILLINOIS TOOL WORKS INC., Glenview, IL (US)

(72) Inventors: Piotr Sliwa, Mount Prospect, IL (US); John F. Healey, Naperville, IL (US); Edward F. Bulgajewski, Genoa, IL (US); Uwe Stapf, Rottingen (DE)

(73) Assignee: Illinois Tool Works Inc., Glenview, IL (US)

( * ) Notice: Subject to any disclaimer, the term of this patent is extended or adjusted under 35 U.S.C. 154(b) by 157 days.

(21) Appl. No.: 15/525,750

(22) PCT Filed: Nov. 8, 2015

(86) PCT No.: PCT/US2015/059646
§ 371 (c)(1),
(2) Date: May 10, 2017

(87) PCT Pub. No.: WO2016/105674
PCT Pub. Date: Jun. 30, 2016

(65) Prior Publication Data
US 2017/0334366 A1 Nov. 23, 2017

Related U.S. Application Data

(60) Provisional application No. 62/095,388, filed on Dec. 22, 2014, provisional application No. 62/196,000, filed on Jul. 23, 2015.

(51) Int. Cl.
*B60R 11/04* (2006.01)
*B60S 1/02* (2006.01)
(Continued)

(52) U.S. Cl.
CPC ............. *B60R 11/04* (2013.01); *B60S 1/02* (2013.01); *B60S 1/0848* (2013.01); *B60S 1/56* (2013.01);
(Continued)

(58) Field of Classification Search
CPC .. B60S 1/026; B60R 11/04; B60R 2011/0026; H05B 3/84; H05B 3/86; H05B 2203/008
(Continued)

(56) References Cited

U.S. PATENT DOCUMENTS 4,857,711 A * 8/1989 Watts ................. H05B 3/845
219/548
4,931,627 A * 6/1990 Watts ................. H05B 3/146
219/203

(Continued)

FOREIGN PATENT DOCUMENTS

CN 103340010 10/2013
CN 103608722 2/2014
(Continued)

OTHER PUBLICATIONS

International Search Report for Application PCT/US2015/055646; dated Jan. 25, 2016.

*Primary Examiner* — Seth W. MacKay-Smith
(74) *Attorney, Agent, or Firm* — Quarles & Brady LLP

(57) ABSTRACT

A heater system for clearing moisture (frozen and liquid) from a windshield (14) around a through-windshield vehicle sensor (18) provides a chamber between the sensor and the windshield containing air that may be heated by a chamber supported heating element (30, 51). The warm air within the chamber applies heat over the windshield in the critical viewing area (26) without obstructing the sensor (18).

20 Claims, 4 Drawing Sheets

(51) Int. Cl.
  *H05B 3/84* (2006.01)
  *B60S 1/08* (2006.01)
  *B60S 1/56* (2006.01)
  *B60R 11/00* (2006.01)
(52) U.S. Cl.
  CPC ........ *H05B 3/84* (2013.01); *B60R 2011/0026* (2013.01)
(58) Field of Classification Search
  USPC ........................................ 219/203, 219, 522
  See application file for complete search history.

(56) References Cited

U.S. PATENT DOCUMENTS

| | | | | |
|---|---|---|---|---|
| 6,512,203 B2* | 1/2003 | Jones | ..................... | H05B 3/146 219/219 |
| 6,995,354 B2* | 2/2006 | Hagen | ................... | B60S 1/0822 219/522 |
| 7,645,961 B2* | 1/2010 | Hernando Fernandez | ................... | B60R 11/04 219/201 |
| 7,731,373 B2* | 6/2010 | Oskarsson | .............. | B60S 1/026 359/512 |
| 9,871,971 B2* | 1/2018 | Wang | ..................... | H04N 7/183 |
| 2007/0216768 A1* | 9/2007 | Smith | ........................ | B60J 1/02 348/118 |
| 2008/0284850 A1* | 11/2008 | Blaesing | ............... | B60S 1/0822 348/148 |
| 2010/0032421 A1* | 2/2010 | Martinez | ................... | H05B 3/84 219/203 |
| 2010/0219173 A1* | 9/2010 | Gruber | ................... | B60S 1/0848 219/203 |
| 2011/0062135 A1* | 3/2011 | Duchayne | ................ | H05B 3/84 219/201 |
| 2012/0103960 A1* | 5/2012 | Bressand | ................... | B60R 11/04 219/203 |
| 2014/0061438 A1* | 3/2014 | Rohde | ................... | H04N 5/2251 250/208.1 |
| 2014/0160284 A1* | 6/2014 | Achenbach | .......... | H04N 5/2251 348/143 |
| 2014/0300738 A1* | 10/2014 | Mueller | ................... | B60R 11/04 348/148 |
| 2015/0034621 A1* | 2/2015 | Timmermann | ......... | B60R 11/04 219/203 |
| 2015/0256729 A1* | 9/2015 | Wato | .................... | H04N 5/2252 348/311 |
| 2016/0091714 A1* | 3/2016 | Hui | ...................... | H04N 5/2251 359/512 |

FOREIGN PATENT DOCUMENTS

| | | |
|---|---|---|
| CN | 104160779 | 11/2014 |
| DE | 102004054161 A1 | 8/2006 |
| DE | 102007035027 A1 | 1/2009 |
| DE | 102010052472 A1 | 5/2012 |
| WO | 2013131700 A1 | 9/2013 |

* cited by examiner

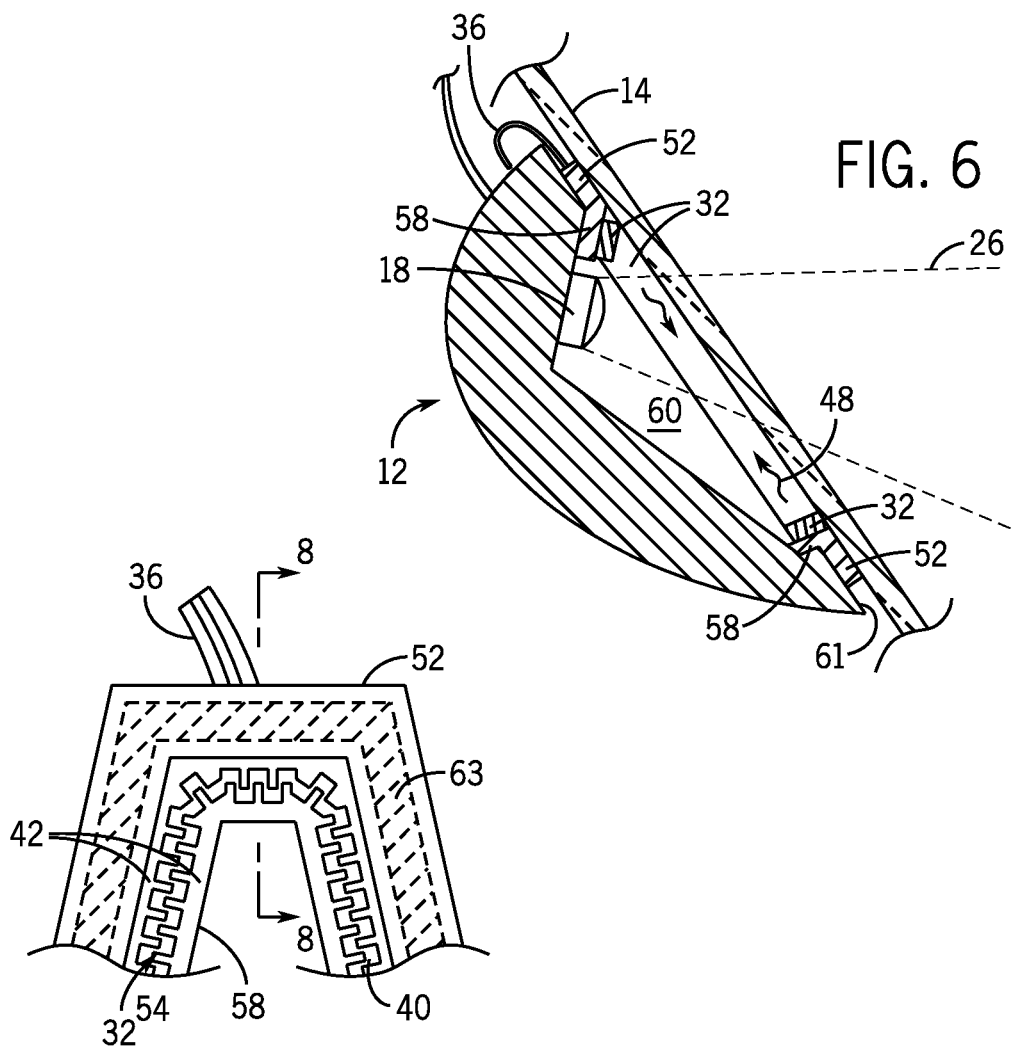
FIG. 6
FIG. 7
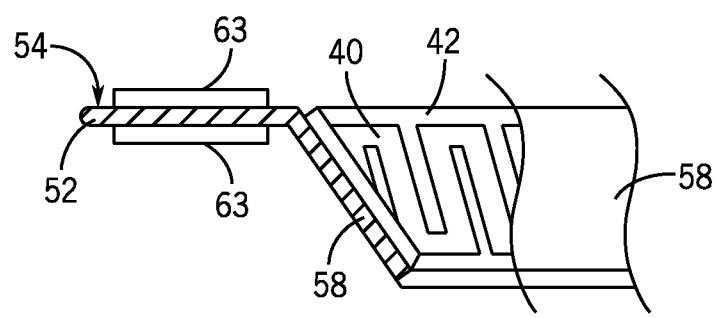
FIG. 8

DUAL PLANE HEATER FOR VEHICLE SENSOR SYSTEM

CROSS REFERENCE TO RELATED APPLICATIONS

This application claims the benefit of U.S. provisional applications 62/095,388 filed Dec. 22, 2014 and 62/196,000 filed Jul. 23, 2015 both hereby incorporated by reference.

FIELD OF THE INVENTION

The present invention relates generally to vehicular systems and, in particular, to advanced vehicular sensor systems such as lane departure sensors.

BACKGROUND OF THE INVENTION

Vehicular systems for determining whether a vehicle is being held within a road lane and, if not, providing a warning to the driver (lane departure warning) are being developed as part of current vehicle safety equipment.

Sensors for use with lane departure warning (LDW) systems may include cameras mounted within the vehicle compartment, typically between the center rearview mirror and the windshield. From this location, the camera is positioned so that its field of view is directed toward the road in front of the vehicle. The space between the camera and the windshield may be protected by a glare shield to prevent light from outside of the field of view of the camera from interfering with the camera sensing.

The image signals obtained from the camera for the LDW are critical to determining the location of the lane lines and thus the relative location of the vehicle. These image signals may be degraded by frost, ice, or fog on the windshield.

SUMMARY OF THE INVENTION

The present invention provides a heater frame that can be inserted between the windshield and the camera to provide a pocket of heated air between the camera and the windshield for improved dissipation of frost, ice, and fog on the windshield without obstructing the camera view. Rearwardly extending flanges from the heater frame may fit into the lens pocket, or the frame may space the camera away from the windshield to provide a larger heated volume. The heater may employ a polymer positive temperature coefficient (PTC) material that provides automatic temperature regulation simplifying control of the heater.

In one embodiment the invention may provide an adapter for a through-windshield sensor having a housing with a first face attachable to the inner surface of a windshield and a second face attachable to a front face of the through-windshield sensor to define an enclosed volume therebetween, the enclosed volume located with respect to the through-windshield sensor to permit sensing by the through-windshield sensor through an area of the windshield abutting the enclosed volume. An electrical resistance heater is supported by the housing and communicates with the enclosed volume to heat the air within the enclosed volume to improve transparency of the windshield against environmental moisture by heating the area of the windshield abutting the enclosed volume.

It is thus a feature of at least one embodiment of the invention to provide a system for removing frost, fog, or ice from the windshield without interfering with the sensor function or requiring excessive power. By heating a contained volume of air, sensor obstruction is avoided while allowing a focused application of heat.

The housing may provide sidewalls extending rearwardly from the windshield and supporting the electrical resistance heater.

It is thus a feature of at least one embodiment of the invention to provide a mounting for the heater that minimizes obstruction with the sensor.

The housing may be a thermoplastic polymer electrical resistance heater with a conductive polymer attached to the sidewalls.

It is thus a feature of at least one embodiment of the invention to provide a thermally resistive housing material that helps contain the heat in the enclosed volume as well as a heater material compatible with that housing.

The conductive polymer may be a positive temperature coefficient material.

It is thus a feature of at least one embodiment of the invention to permit a spatially distributed heater that reduces the possibility of hotspots through an autoregulation feature of positive temperature coefficient.

The conductive polymer may be attached to an inner surface of the sidewalls proximate to the enclosed volume.

It is thus a feature of at least one embodiment of the invention to reduce thermal resistance between the heater material and the enclosed volume.

The sidewalls may fit within a receiving pocket of the through-windshield sensor to extend along corresponding sidewalls of the receiving pocket of the through-windshield sensor.

It is thus a feature of at least one embodiment of the invention to provide a heater system that may work with existing sensor systems having preconfigured glare shields.

The first face of the housing may provide a first flange surface abutting an inner surface of the windshield and including an adhesive for attachment of the flange surface to the windshield.

It is thus a feature of at least one embodiment of the invention to provide a simple mounting system that may seal and support the adapter on the windshield and may be usable with a variety of different windshield designs.

The second face of the housing may provide a second flange surface abutting a front surface of the through-windshield sensor and include an attachment means for attaching the second plane surface to the through-windshield sensor.

It is thus a feature of at least one embodiment of the invention to provide a heater adapter that may be placed between the sensor and the windshield to support the two and a predetermined orientation and separation.

The first and second flange surfaces may be on opposite sides of a single flange extending radially outward around the enclosed volume.

It is thus a feature of at least one embodiment of the invention to provide an extremely low profile heater system that may work with a variety of pre-existing sensor systems without unduly changing the spacing between the sensor and the windshield.

The flange surface of the second face may include an adhesive for attaching the flange surface to the front surface of the through-windshield sensor.

It is thus a feature of at least one embodiment of the invention to provide a low-profile attachment method for attaching the invention to both the windshield and the sensor system.

Alternatively, the second flange surface may be on a flange extending inwardly from the sidewalls.

It is thus a feature of at least one embodiment of the invention to allow movement of the sidewalls outward from the field of view of the sensor to prevent interference therewith.

The electrical resistance heater may include a first portion extending inside the enclosed volume to attach to the windshield at a periphery of an area of the windshield abutting the enclosed volume.

It is thus a feature of at least one embodiment of the invention to provide heat directly to the windshield for rapid response before the heated volume attains temperature.

The electrical resistance heater may be a conductive polymer on a flexible substrate and may further include second portion deformable with respect to a plane of the first portion to attach to a wall of the housing.

It is thus a feature of at least one embodiment of the invention to provide a simple fabrication method allowing two planes of heating zones, one on the windshield and one on the enclosure sidewalls.

The second portion may attach to a lowermost sidewall of the housing.

It is thus a feature of at least one embodiment of the invention to maximize heat transfer and take advantage of natural convection within the enclosed volume.

The first and second portions may be formed from a single continuous sheet of flexible material with the second portion formed from the single continuous sheet from an area within the first portion.

It is thus a feature of at least one embodiment of the invention to provide a manufacturing process that reduces waste by employing a nested heater portion layout.

The first and second portions may be electrically joined by a flexible arm formed from the single continuous sheet within the first portion and outside of the second portion.

It is thus a feature of at least one embodiment of the invention to permit displacement of the two heater portions when formed of a continuous material.

The housing provides mechanical support for the through-windshield sensor.

It is thus a feature of at least one embodiment of the invention to simplify manufacture and alignment of the sensor system when used with the heater of the present invention.

Other features and advantages of the invention will become apparent to those skilled in the art upon review of the following detailed description, claims and drawings in which like numerals are used to designate like features.

BRIEF DESCRIPTION OF THE DRAWINGS

FIG. 6 is a simplified elevational cross-section of the assembled heater frame and camera showing the extension of the flanges into the camera lens pocket;

FIG. 7 is a fragmentary, front elevational view of the frame showing positioning of adhesive on a front surface of the frame attachable to the windshield and a heater element attached to the inner surface of the flange;

FIG. 8 is a cross-sectional view along line 8-8 of FIG. 7 showing adhesive on the rear surface of the frame for attachment of the frame to the camera assembly;

Figure 1:
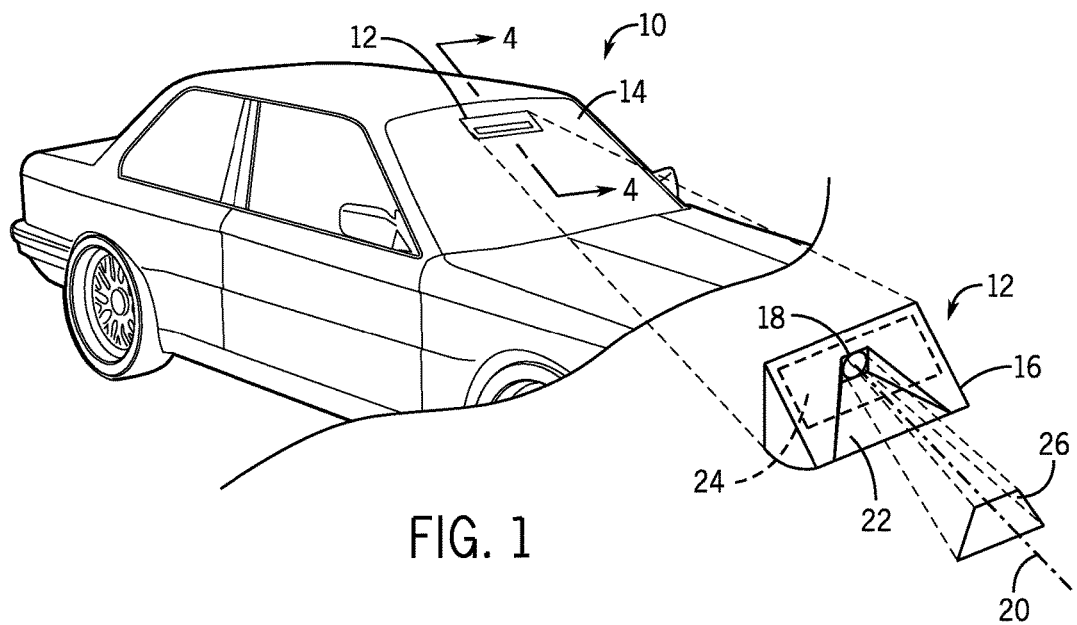
FIG. 1 is a perspective view of an automobile windshield from outside of the automobile showing a typical placement of an LDW sensor and showing a detailed view of the camera and glare shield for the sensor.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a vehicle 10 may provide for a lane departure warning (LDW) sensor system 12 positioned at a top center location on a windshield 14 of the vehicle 10. Generally the LDW sensor system 12 may provide for a glare shield 16 positioned around a lens of a camera 18, the latter of which may be directed along a view axis 20 toward a road in front of the vehicle 10 to monitor the position of lane lines on the road (not shown). The glare shield 16 may be constructed for example of an injection molded thermoplastic material of a dark color with a surface coated or textured to reduce reflection.

Figure 4:
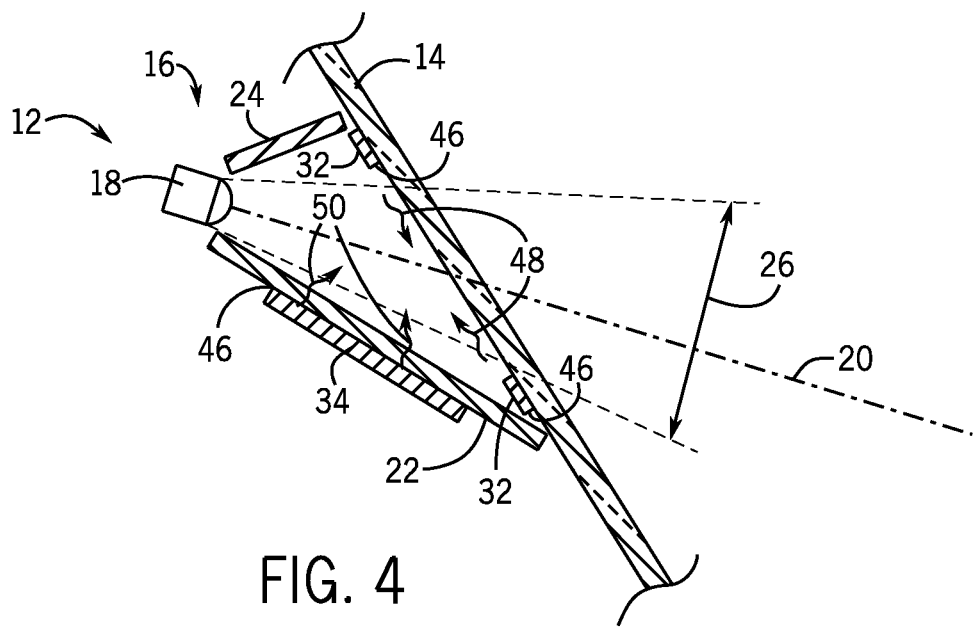
FIG. 4 is a simplified elevational cross-section of the assembled heater windshield and glare shield showing dual-mode of heating provided by the invention.

Referring momentarily to FIG. 4, the glare shield 16 may include a lower triangular glare panel 22 extending from the windshield 14 to a lower edge of the camera 18 and an upper glare panel 24 extending from an upper edge of the camera 18 to the windshield 14. The upper glare panel 24 and lower glare panel 22 angle away from each other as one moves from the camera 18 to the windshield 14 so as to follow but not obstruct a field of view 26 of the camera about axis 20, the latter necessary for the camera to properly view the road.

Figure 2:
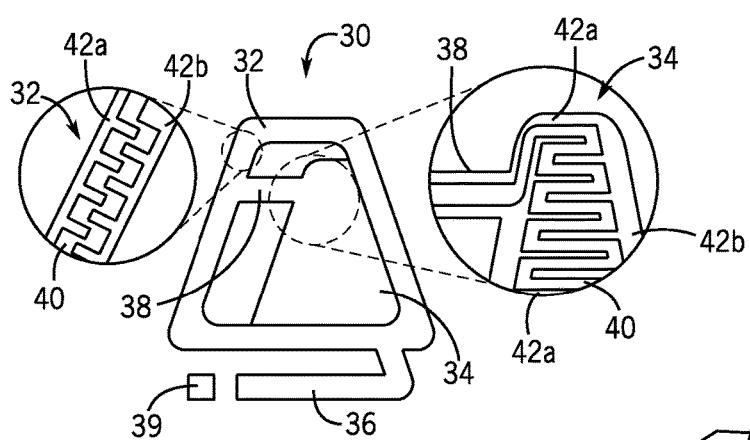
FIG. 2 is a top plan view of a heater assembly for heating the windshield and glare shield of FIG. 1.

Referring now to FIG. 2, the present invention may employ a flexible heater sheet 30 providing a heater ring 32 having a trapezoidal shape whose inner periphery conforms to the field of view 26. The heater ring 32 will be placed against the inner surface of the windshield 14 as will be described below.

Nested within the trapezoidal heater ring is a smaller heater panel 34 having a trapezoidal periphery sized to fit against the lower surface of the lower glare panel 22 and heat a continuous area of that lower glare panel 22 as will be described below.

The heater ring 32 communicates, via a tail conductor strip 36, with an electrical connector 39 providing electrical power to the flexible heater sheet 30. This electrical power is in turn communicated from the heater ring 32 through a flexible arm 38 passing from the heater ring 32 to the heater panel 34.

The heater ring 32, flexible arm 38, trapezoidal heater panel 34, and tail conductor strip 36 may all be cut from a single planar sheet of flexible polymer through a die-cutting operation or the like. A suitable length of the flexible arm 38 is possible by displacing the smaller heater panel 34 rightward in the inner periphery of the heater ring 32 to provide a distance defining a length of the flexible arm 38 between a left surface of the smaller heater panel 34 and an inner wall of a right side of the heater ring 32.

The flexible heater sheet 30 may be constructed of a single, flexible, continuous thin sheet of polymer material 40 having the property of conducting electricity with a positive temperature coefficient of resistance. A positive temperature coefficient of resistance causes the amount of electrical flow to vary according to the temperature of the material, with increased electrical flow at lower temperatures and decreased electrical flow at higher temperatures. This property provides for a self-regulating temperature of the polymer material 40 when a substantially constant voltage source is applied across the polymer material 40.

The top surface of the polymer material 40 may support interdigitated electrodes 42a and 42b each connected to a different voltage polarity that apply voltage across the polymer material 40 promoting current flow through the polymer material 40 generally along the plane of its extent.

Positive temperature coefficient (PTC) heaters, suitable for the present invention, are also disclosed in U.S. Pat. Nos. 4,857,711 and 4,931,627 to Leslie M. Watts hereby incorporated in their entirety by reference.

Alternatively the flexible heater sheet 30 may be constructed of a flexible insulating sheet of polymer material with a resistive conductor applied to the upper surface to form a resistive or ohmic heating element. In this case, a constant voltage or current may be applied to the conductor to provide a given heat output. The current may be controlled according to a temperature sensor or operated in an "open loop" fashion.

Figure 3:
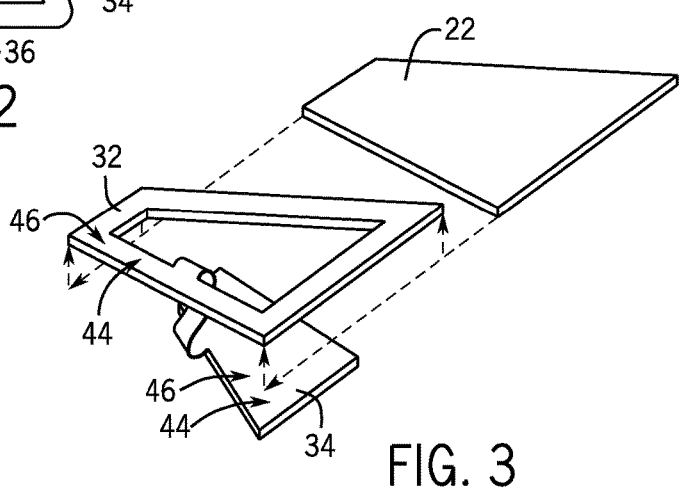
FIG. 3 is a perspective view of the heater assembly of FIG. 2 separated so that a portion of the heater assembly may attach to the windshield and a portion may fit beneath a bottom plate of the glare shield to heat the same.

Referring now to FIG. 3, during manufacture, the heater ring 32 may be separated from the heater panel 34 by tipping a lower edge of a plane of the heater ring 32 upward with respect to a plane of the heater panel 34 allowing the lower glare panel 22 to be inserted therebetween. An upper surface 44 of the heater panel 34 may have a pressure sensitive adhesive 46 applied to that upper surface 44 to attach the heater panel 34 to the lower surface of the glare panel 22. An upper surface 44 of the heater ring 32 may also have a pressure sensitive adhesive 46 applied to the upper surface 44 so that the heater ring 32 may be attached to the inside of the windshield 14.

Referring again to FIG. 4, the heater ring 32 may be attached to an inner surface of the windshield 14 to frame the field of view 26 and to provide heat to the glass of the windshield 14, the heat passing by conductivity inward from the heater ring 32 as indicated by arrows 48. In addition, heat from the heater panel 34 may pass upward into the space between the glare panels 22 and 24 through the glare panel 22 as indicated by arrows 50 to heat the volume defined between glare panels 22 and 24 and the windshield 14 for additional heating.

It will be appreciated that in an alternative embodiment, the heater ring 32 may be attached directly to structure of the glare panels 22 and 24, for example, onto flanges facing inward from the glare panels 22 and 24 at ends of the glare panels 22 and 24 proximate but not necessarily touching the windshield 14. Alternatively, a clear window (not shown) may be provided spanning the edges of the glare panels 22 and 24 proximate to the windshield 14 and the heater ring 32 attached to that window. The adhesive 46 on these designs may be moved between a front and rear surface of the heater ring 32 as is necessary for the attachment required. In any one of these examples, the heater panel 34 may be placed either on the lower surface of the glare panel 22 or its upper surface or on other structure of the lens pocket 60 that will provide the desired heating effect.

It will further be noted that a variety of different glare shield designs may be used and that the present heater system will accommodate a variety of different structures and surface attachments while providing dual plane heating.

Figure 5:
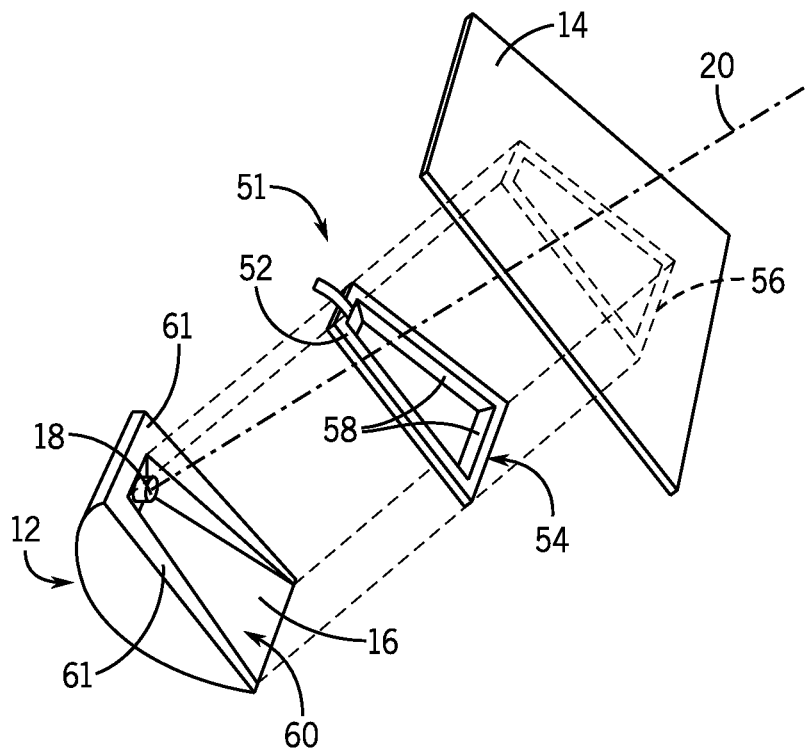
FIG. 5 is an exploded perspective view of a second embodiment of the invention providing a heater frame that may be positioned between the camera and windshield and having rearwardly extending heater flanges extending into the camera lens pocket.

Referring now to FIGS. 5 and 6, in a second embodiment, the invention may provide for a heater assembly 51 having a generally planar heater frame 52 in the shape of a regular trapezoid with a planar front face 54. The planar front face 54 may fit against and be attached to an underside of the windshield 14 in attachment area 56 by an adhesive or other means.

Extending rearwardly from the inner edges of the heater frame 52 are heater support sidewalls 58 that are sized to be received in a lens pocket 60 of the sensor system 12, the lens pocket 60 holding the camera 18 below the surface of a front housing face 61, the latter which would otherwise attached directly to a planar rear surface of the windshield 14. The trapezoidal shape of the heater frame 52 positions the heater support sidewalls 58 to conform closely to the walls of the lens pocket 60 out of the way of the field of view 26 of the camera 18 as the camera 18 is directed through the windshield 14.

Referring also to FIG. 7, inner surfaces of the rearwardly extending heater support sidewalls 58 hold a heater ring 32 similar to that discussed above. The heater ring 32 may have interdigitated electrodes 42 in electrical communication with a lower substrate of positive temperature coefficient polymer material 40. Generally, the heater ring 32 may be fabricated separately as a strip and then applied by adhesive or other means to the inner surfaces of the heater support sidewalls 58. Electricity is applied to the heater ring 32 by a tail conductor strip 36 which may connect through a connector in the sensor system 12 to share power provided to the sensor system 12 in order to heat the heater ring 32. As shown by arrows 48, heat from the heater ring 32 warms the air within the lens pocket 60 and consequently a portion of the windshield 14 within the attachment area 56 to reduce fogging, icing, and other similar obstructions on the windshield 14 within the attachment area 56.

Referring to FIG. 8, opposite faces of the frame 52 may have a pressure sensitive adhesive 63 so that the heater assembly 51 may serve to attach the sensor system 12 to the windshield 14 and thereby to fully support the sensor system 12. This attachment first attaches heater assembly 51, by lower adhesive 63 on the frame 52, to the front housing face 61 of the sensor system 12 and then attaches the heater assembly 51 to the windshield 14 using an upper adhesive 63 attaching the front face 54 of the frame 52 to the windshield 14.

Figure 9:
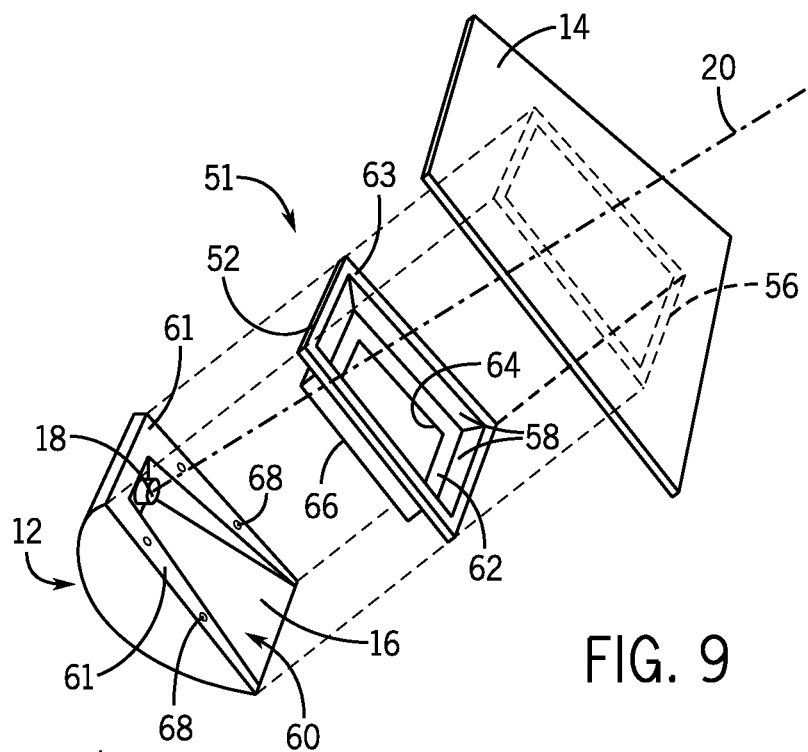
FIG. 9 is a figure similar to FIG. 5 of a third embodiment of the invention having a heater frame that spaces the camera assembly away from the windshield to provide an increased heated air volume.
Figure 10:
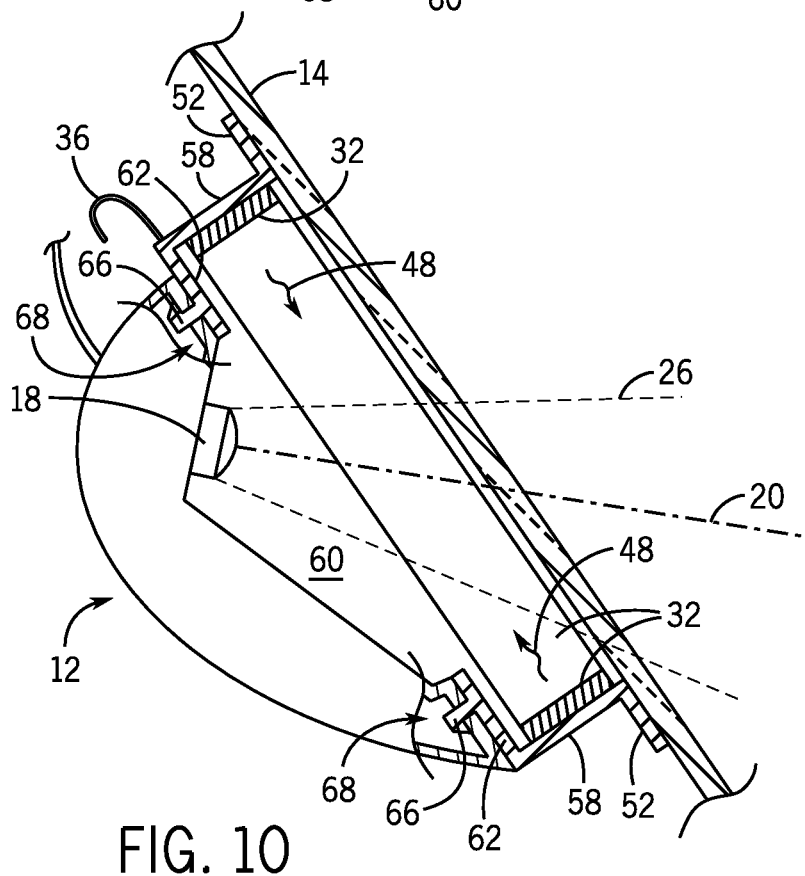
FIG. 10 is a figure similar to FIG. 6 showing an elevational cross-section of the heater frame of FIG. 9 and camera assembled to the windshield.

Referring now to FIGS. 9 and 10, in an alternative embodiment, the dimensions of the frame 52 may be increased so that the rearwardly extending sidewalls 58 do not fit within the lens pocket 60 but are larger than the lens pocket 60. Rearward edges of the sidewalls 58 joined to an outer periphery of a secondary flanges 62 extending inward from the rearward edges of the sidewalls 58. The secondary flanges 62 is generally parallel to the frame 52 although spaced rearwardly from the frame 52 and provides a central trapezoidal opening 64 generally conforming to the opening of the lens pocket 60 and sized to prevent interference with the field of view 26.

A rear face of the secondary flanges 62 may include rearwardly extending attachment elements 66, for example, barbed studs, hooks or snaps that fit within and may be retained within corresponding sockets 68 in the front housing face 61 of the sensor system 12 to attach the secondary flanges 62 to the front housing face 61. Alternatively, an adhesive may be used such as a pressure sensitive or two-part adhesive. As before, a front surface of the frame 52 may include adhesive 63 (for example, a pressure sensitive adhesive) to attach it to the inside of the windshield 14.

As shown in FIG. 10, heater ring 32 is attached to the inner walls of the rearwardly extending sidewalls 58 to provide heat as shown by arrows 48 both to the lens pocket 60 and an expanded volume between the sensor system 12 and the windshield 14. This increased volume provides greater thermal mass thus helping regulate the temperature in the lens pocket 60 against abrupt changes in outdoor thermal conditions.

It will be appreciated that the sensor system 12 of any of the above embodiments may be not only optical sensors such as cameras but also radar antennas for radar systems or ultrasonic acoustic transducers for ultrasound systems and in these latter cases, the windshield 14 may be replaced with a specialized window material.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claim.

What is claimed is:

1. An adapter for a through-windshield sensor, comprising:
    a housing having a first face attachable to an inner surface of a windshield and a second face attachable to the through-windshield sensor to define an enclosed volume therebetween, the enclosed volume located with respect to the through-windshield sensor to permit sensing by the through-windshield sensor through an area of the windshield abutting the enclosed volume; and
    an electrical resistance heater supported by the housing and framing a field of view of the through-windshield sensor, and communicating with the enclosed volume to heat air within the enclosed volume to improve transparency of the windshield against environmental moisture by heating the area of the windshield abutting the enclosed volume,
    wherein the electrical resistance heater includes a first portion extending inside the enclosed volume to attach to the windshield at a periphery of the area of the windshield abutting the enclosed volume, and
    wherein the electrical resistance heater is a conductive polymer on a flexible substrate and further includes a second portion deformable with respect to a plane of the first portion to attach to a wall of the housing.

2. The adapter of claim 1 wherein the housing provides sidewalls extending rearwardly from the windshield and supporting the electrical resistance heater.

3. The adapter of claim 2 wherein the housing is coupled to a thermoplastic polymer electrical resistance heater with the conductive polymer attached to the sidewalls of the housing.

4. The adapter of claim 3 wherein the conductive polymer is a positive temperature coefficient material.

5. The adapter of claim 1 wherein the second portion attaches to a lowermost sidewall of the housing.

6. The adapter of claim 1 wherein the first and second portions may be formed from a single continuous sheet of flexible material with the second portion formed from the single continuous sheet from an area within the first portion.

7. The adapter of claim 6 wherein the first and second portions are electrically joined by a flexible arm formed from the single continuous sheet within the first portion and outside of the second portion.

8. The adapter of claim 6 wherein the first and second portions are formed through a die cutting operation.

9. The adapter of claim 1 wherein the housing provides mechanical support for the through-windshield sensor.

10. The adapter of claim 1 wherein the through-windshield sensor is selected from the group consisting of an optical imaging camera, a radar system, and an ultrasound system.

11. A vehicular sensor system, comprising:
    a through-windshield sensor for providing signals representing sensed environment outside of a vehicle;
    a housing having a first face attachable to an inner surface of a windshield and a second face attachable to the through-windshield sensor to define an enclosed volume therebetween, the enclosed volume located with respect to the through-windshield sensor to permit sensing by the through-windshield sensor through an area of the windshield abutting the enclosed volume;
    an electrical resistance heater supported by the housing and framing a field of view of the through-windshield sensor, and communicating with the enclosed volume to heat air within the enclosed volume to improve transparency of the windshield against environmental moisture by heating the area of the windshield abutting the enclosed volume; and
    the housing providing sidewalls extending rearwardly from the windshield and supporting the electrical resistance heater,
    wherein the first face of the housing provides a first flange surface abutting the inner surface of the windshield and including an adhesive for attachment of the first flange surface to the windshield, and
    wherein the second face of the housing provides a second flange surface abutting a front surface of the sensor system and positioned on a flange extending inwardly from the sidewalls, and including an attachment means for attaching the second flange surface to the sensor system.

12. The vehicular sensor system of claim 11 wherein the through-windshield sensor is selected from the group consisting of an optical imaging camera, a radar system, and an ultrasound system.

13. The vehicular sensor system of claim 11 wherein the housing is coupled to a thermoplastic polymer electrical resistance heater with a conductive polymer attached to the sidewalls of the housing.

14. The vehicular sensor system of claim 13 wherein the conductive polymer is a positive temperature coefficient material.

15. The vehicular sensor system of claim 13 wherein the conductive polymer is attached to the inner surface of the sidewalls proximate to the enclosed volume.

16. The vehicular sensor system of claim 11 wherein the first and second flange surfaces are opposite sides of the sidewall defining the enclosed volume.

17. The vehicular sensor system of claim 16 wherein the second flange surface includes an adhesive for attaching the second flange surface to the front surface of the sensor system.

18. An adapter for a through-windshield sensor, comprising:
a housing having a first face attachable to an inner surface of a windshield and a second face attachable to the through-windshield sensor to define an enclosed volume therebetween, the enclosed volume located with respect to the through-windshield sensor to permit sensing by the through-windshield sensor through an area of the windshield abutting the enclosed volume;
an electrical resistance heater supported by the housing and framing a field of view of the through-windshield sensor, and communicating with the enclosed volume to heat air within the enclosed volume to improve transparency of the windshield against environmental moisture by heating the area of the windshield abutting the enclosed volume; and
sidewalls on the housing extending rearwardly from the windshield and supporting the electrical resistance heater,
wherein the first face of the housing provides a first flange surface abutting the inner surface of the windshield and including an adhesive for attachment of the first flange surface to the windshield, and
wherein the second face of the housing provides a second flange surface abutting a front surface of a sensor system and positioned on a flange extending inwardly from the sidewalls, and including an attachment means for attaching the second flange surface to the sensor system.

19. The adapter of claim 18 wherein the housing is coupled to a thermoplastic polymer electrical resistance heater with a conductive polymer attached to the sidewalls of the housing.

20. The adapter of claim 19 wherein the conductive polymer is a positive temperature coefficient material.

* * * * *